United States Patent [19]

Goto

[11] Patent Number: 4,884,268

[45] Date of Patent: Nov. 28, 1989

[54] REPEATER ARRANGEMENT CAPABLE OF AVOIDING ACCUMULATION OF STUFF JITTERS

[75] Inventor: Kunihiro Goto, Tokyo, Japan

[73] Assignee: NEC Corporation, Tokyo, Japan

[21] Appl. No.: 269,026

[22] Filed: Nov. 9, 1988

[30] Foreign Application Priority Data

Nov. 9, 1987 [JP] Japan .................................. 62-281075

[51] Int. Cl.$^4$ .............................................. H04J 3/07
[52] U.S. Cl. ...................................... 370/102; 370/105
[58] Field of Search .................. 370/100, 102, 105, 97; 375/118

[56] References Cited

U.S. PATENT DOCUMENTS 4,757,452  7/1988  Scott et al. ........................... 370/102
4,811,340  3/1989  McEachern et al. ................ 370/102

Primary Examiner—Douglas W. Olms
Assistant Examiner—Melvin Marculo
Attorney, Agent, or Firm—Sughrue, Mion, Zinn, Macpeak & Seas

[57] ABSTRACT

In a repeater arrangement supplied with a sequence of input multiplexed signals to produce a sequence of output multiplexed signals, with stuff signals included in each of the input and the output multiplexed signals, the input multiplexed signals are demultiplexed by a demultiplexer into a plurality of demultiplexed signals assigned to channels and are stored in first-in-first-out (FIFO) memories with the stuff signals destuffed. Stuff information related to the destuffed signals is memorized in a stuff memory to be sent to a multiplexer. The multiplexer carries out readout operations of the respective FIFO memories with reference to the stuff information by the use of readout pulses which have the same rate and which can reproduce the stuff signals. A phase comparator compares phases of preselected pulses derived by the multiplexer and the demultiplexer with each other and controls a single phase-locked oscillator coupled to the multiplexer.

2 Claims, 7 Drawing Sheets

REPEATER ARRANGEMENT CAPABLE OF AVOIDING ACCUMULATION OF STUFF JITTERS

BACKGROUND OF THE INVENTION

This invention relates to a repeater arrangement for use in repeating a sequence of input multiplexed signals to produce a sequence of output multiplexed signals in a digital transmission network.

A conventional repeater arrangement of the type described is supplied with a sequence of input multiplexed signals divisible into a sequence of multiframes each of which is subdivided into a plurality of subframes. Each subframe is composed of a predetermined number of time slots assigned to channels, respectively. A data signal unit is arranged in each time slot determined for each channel. Herein, it is to be noted that such data signal units are not always produced at the same bit rate but usually at bit rates which are different from one another. In order to equalize the different bit rates, one or more stuff pulses are arranged in a predetermined one of the subframes of each multiframe.

In the repeater arrangement, such an input multiplexed signal sequence is demultiplexed by a demultiplexer into a plurality of demultiplexed signals assigned to the respective channels. The demultiplexed signals are delivered to external devices and are memorized in a plurality of elastic memories, respectively, which may be operable as an intermediate circuit and which are in one-to-one correspondence to the channels. Such write-in operations of the demultiplexed signals are carried out by the use of a plurality of write-in clock pulses each of which is inhibited at a time instant at which each stuff pulse is located. As a result, the demultiplexed signals are written into the respective elastic memories with the stuff pulses destuffed. The memorized demultiplexed signals are read out of the elastic memories as reproduced demultiplexed signals in synchronism with readout clock pulses which are given from voltage-controlled oscillators coupled to phase comparators so as to form phase-locked loops, respectively. The phase comparators compare the readout clock pulses with the write-in clock pulses to produce phase control signals and to thereby control the voltage-controlled oscillators, respectively.

The reproduced demultiplexed signals are sent to a multiplexer to be multiplexed into a sequence of output multiplexed signals with stuff pulses added thereto.

As is readily understood from the above, each of the phase-locked loops is necessary for every one of the channels. This shows that the phase-locked loops would increase in number with an increase of the channels and that the conventional repeater arrangement becomes more expensive as the number of the channels increases.

In addition, the readout clock pulses are controlled by the phase comparators in relation to the write-in clock pulses which are inhibited at the time instants of the stuff pulses. Inasmuch as the readout clock pulses are derived from the write-in clock pulses which are inhibited at the time instants for the stuff pulses, phases of the readout clock pulses subtly fluctuate due to pulse stuffing and cause phase differences to occur in each of the readout clock pulses. Such phase differences in the readout clock pulses give rise to phase jitters and result in accumulation of stuff jitters which come from the phase jitters.

SUMMARY OF THE INVENTION

It is an object of this invention to provide a repeater arrangement which is inexpensive as compared with a conventional repeater arrangement.

It is another object of this invention to provide a repeater arrangement of the type described, wherein it is possible to avoid occurrence of stuff jitters which result from phase differences among readout clock pulses.

A repeater arrangement to which this invention is applicable is for dealing with a sequence of input multiplexed signals to produce a sequence of output multiplexed signals. Each of the input and the output multiplexed signal sequences is a sequence of multiframes each of which is subdivided into a plurality of subframes. Each of the input and the output multiplexed signal sequences comprises a sequence of a plurality of data signals assigned to a plurality of channels, respectively, at every subframe and a plurality of stuff pulses arranged in a predetermined one of the subframes. The repeater arrangement comprises a demultiplexer for demultiplexing the input multiplexed signal sequence to produce a plurality of demultiplexed signals assigned to the channels of the multiframes, stuff control signals representative of presence and absence of said stuff bite, and a first multiframe pulse indicative of each multiframe of the input multiplexed signal sequence together with a first set of demultiplexing clock pulses which are synchronized with the demultiplexed signals with the demultiplexing clock pulses suppressed during presence of the stuff pulses, respectively, intermediate means responsive to the demultiplexed signals and the demultiplexing clock pulses for producing a plurality of intermediate demultiplexed signals, and a multiplexer coupled to the intermediate means for multiplexing the intermediate demultiplexed signals into the output multiplexed signal sequence. According to this invention, the multiplexer comprises clock supplying means for supplying the intermediate means with a second set of timing clock pulses at a predetermined clock rate. The timing clock pulses are suppressed during the presence of said stuff pulses. The multiplexer further comprises multiframe producing means responsive to a phase adjusted clock pulse for producing a second multiframe pulse indicative of each multiframe of the output multiplexed signals. The intermediate means comprises first memorizing means operable in a first-in-first-out order and coupled to the demultiplexer and the multiplexer for memorizing the plurality of the demultiplexed signals in response to the first set of demultiplexing clock pulses with the stuff pulses destuffed, to successively produce, as the intermediate demultiplexed signals, the demultiplexed signals memorized in the memorizing means in timed relation to the second set of the timing clock pulses, second memorizing means coupled to the demultiplexer and the multiplexer for memorizing the stuff control signals to produce the stuff control signals memorized in the second memorizing means as stuff information signals which are produced at time instants assigned to the demultiplexed signals, a phase comparator coupled to the demultiplexer and the multiplexer for comparing phases of the first and the second multiframe pulses with each other to produce a phase difference signal representative of a phase difference between the first and the second multiframe pulses, clock signal generating means responsive to the phase difference signal for producing a sequence of output clock pulses synchronized with said demultiplexing clock pulses, and means for supplying the output clock pulses to the multiplexer as the phase adjusted clock pulses.

Figure 1:
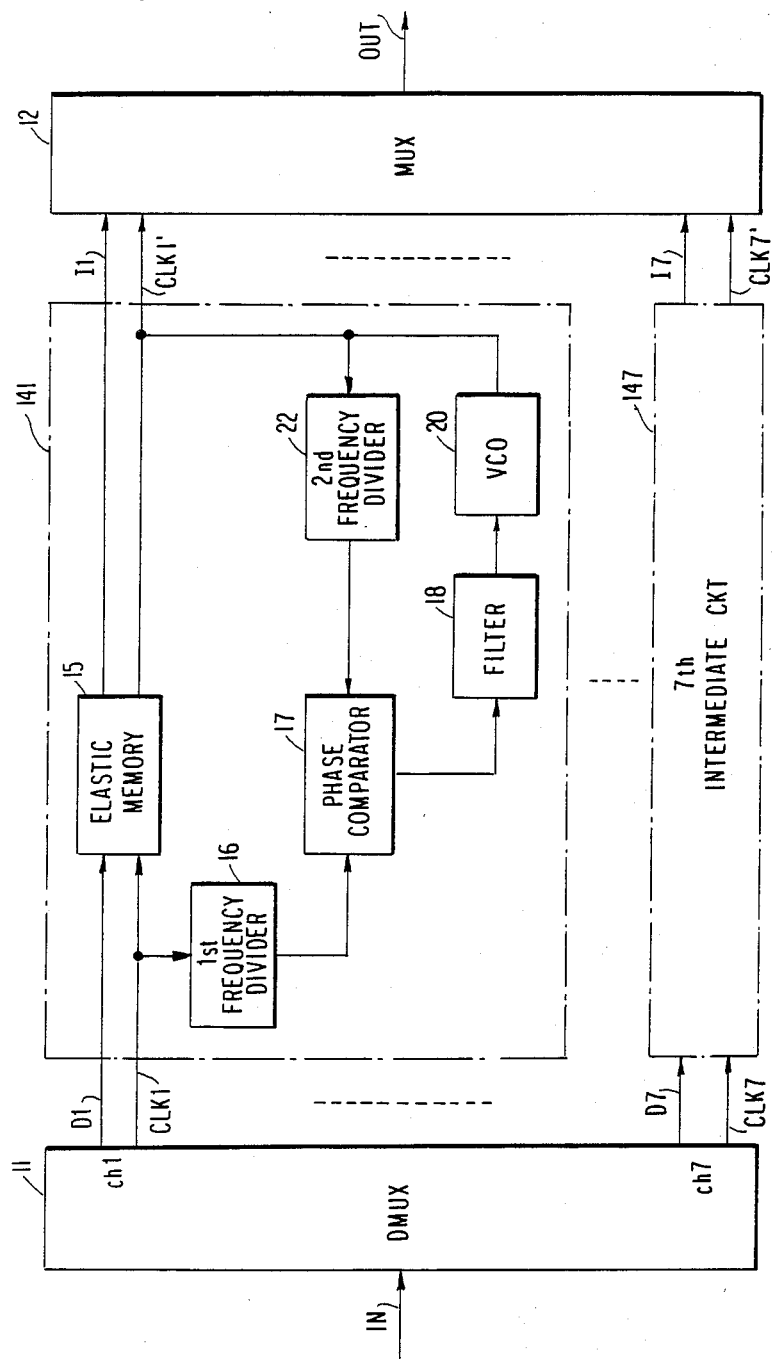
FIG. 1 is a block diagram of a conventional repeater arrangement.

DESCRIPTION OF THE PREFERRED EMBODIMENTS:

Referring to FIG. 1, a conventional repeater arrangement will be described for a better understanding of this invention. The illustrated repeater arrangement is supplied with a sequence of input multiplexed signals IN to produce a sequence of output multiplexed signals OUT. Each of the input and the output multiplexed signals IN and OUT may be collectively referred to as a high group signal or a high speed data signal. Each of the input and the output multiplexed signals IN and OUT is assumed to be assigned or distributed to first through n-th channels ch1 to chn and to include stuff pulses or bits determined for the respective channels, respectively. In the following description, it will be surmised without loss of generality that the number n of the channels is equal to seven.

Figure 2:
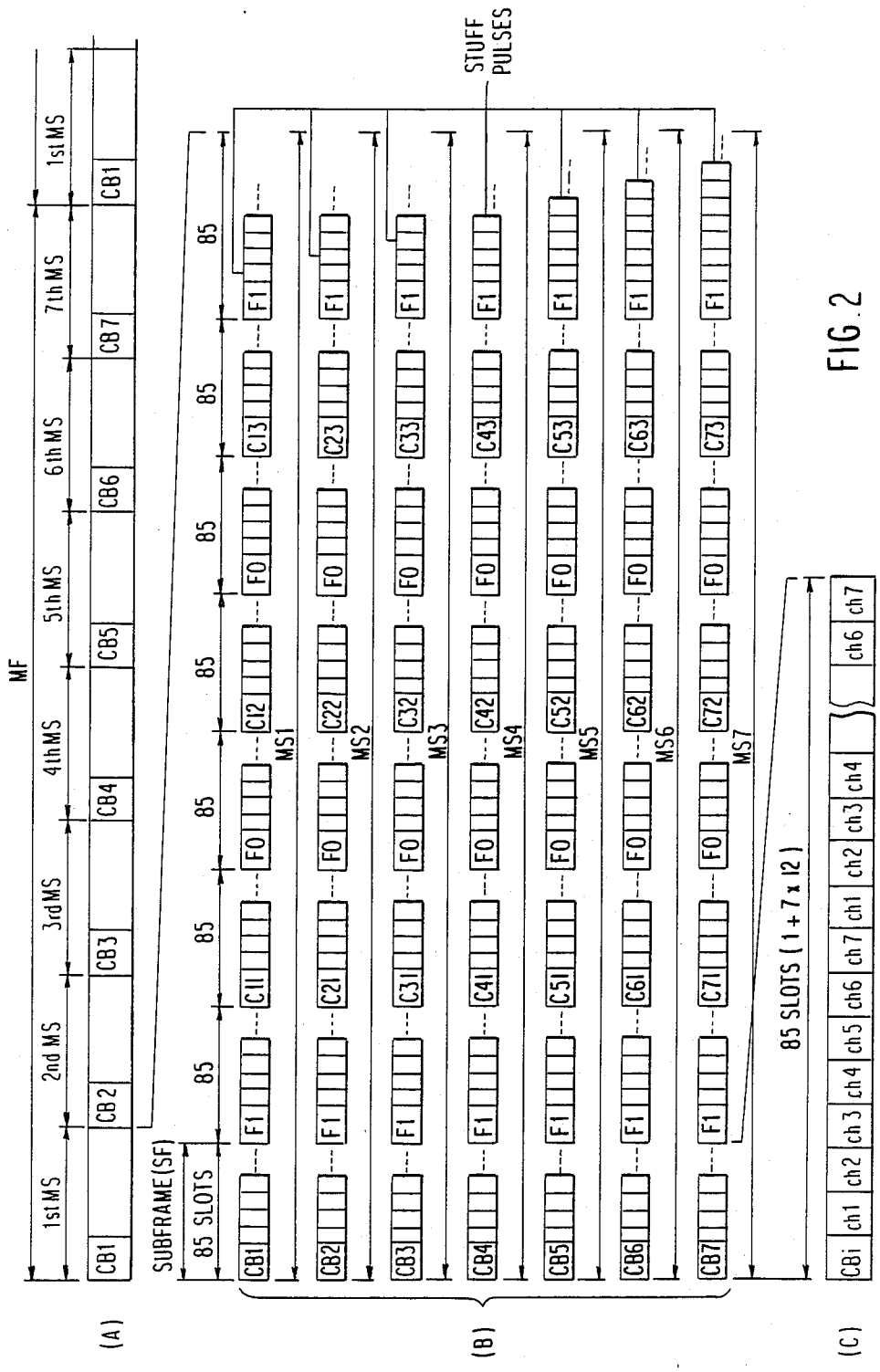
FIG. 2(A) to (C) are time charts of each of input and output multiplexed signal sequences used in this invention.

Referring to FIG. 2 for a short while, each of the input and the output multiplexed signals IN and OUT has a data rate of 44.736 Mb/s and is divisible into a sequence of multiframes MF only one of which is illustrated in FIG. 2(A). Each multiframe is subdivided into first through seventh multi-subframes MS1 to MS7 which are succeeded by first through seventh multi-subframe pulses CB1 to CB7, as shown in FIG. 1(B), which may be leading bits of the first through seventh multi-subframes MS1 to MS7. Especially, the first multi-subframe pulse CB1 serves to also specify a leading bit of each multiframe MF and may therefore be called a multiframe pulse.

As shown in FIG. 2(B), each of the first through seventh multi-subframes MS1 to MS7 is also divided into first through eighth subframes SF each of which is composed of eighty-five time slots for locating single bits, respectively. The first through seventh multi-subframe pulses CB1 to CB7 are located at leading ones of the time slots of the leading subframes included in the first through seventh multi-subframes MS1 to MS7, as illustrated from an uppermost line to a lowermost line of FIG. 2(B), respectively. The second through eighth subframes SF of each multi-subframe MSi are specified by control bits located at leading time slots thereof and are represented by F1, Ci1, F0, Ci2, F0, Ci3, and F1, where i is variable between unity and seven, both inclusive. The remaining eighty-four time slots except the leading time slot of each subframe are successively and repeatedly assigned with data bits of the respective channels depicted at ch1 to ch7 twelve times, as shown in FIG. 2(C).

It is to be noted here that stuff pulses for the channels are allotted to the eighth or last subframes of the first through seventh multi-subframes MS1 to MS7, respectively. More specifically, the stuff pulse for the channel ch1 is located in a second one of the time slot of the eighth subframe in the first multi-subframe MS1. Likewise, the stuff pulses for the channels ch2 to ch7 are located in third through eighth ones of the time slots of the eighth subframes in the second through seventh multi-subframes MS2 to MS7, respectively. The time slots for locating the stuff pulses will be called stuff time slots hereinafter. Each of the stuff pulses is not always assigned to the stuff time slot in place. Accordingly, it is necessary to detect before arrival of the stuff time slot whether or not the stuff pulse is present. For this purpose, the control bits Ci1 to Ci3 of preceding subframes in each multi-subframe are used as a stuff control signal of three bits. In the example being illustrated, judgement is made as the stuff pulse being present when two or more bits of the stuff control signal take logic "1" levels. Otherwise, judgement is made as the stuff pulse being absent.

Referring back to FIG. 1, the input multiplexed signal sequence IN is given to a demultiplexer (DMUX) 11 while the output multiplexed signal sequence OUT is produced from a multiplexer (MUX) 12. The illustrated demultiplexer 11 demultiplexes the input multiplexed signal sequence IN into first through seventh demultiplexed signals D1 to D7 (may be represented by Di) assigned to the channels ch1 to ch7 together with first through seventh clock pulses CLK1 to CLK7 which may be called a first set of clock pulses, respectively. The first through seventh demultiplexed signals D1 to D7 may be collectively called a low group signal or a low speed data signal. It is noted here that the first through seventh clock pulses CLK1 to CLK7 (CLKi) are not generated at the stuff time slots as mentioned in FIG. 2(B). This shows that the first through seventh clock pulses CLK1 to CLK7 are partially removed or inhibited at the stuff time slots or instants at which the stuff pulses are present. Such partial removal or inhibition of the first through seventh clock pulses CLK1 to CLK7 can be done by repeatedly monitoring the multiframes MF in a known manner to detect a pattern formed by the multi-subframe pulses CB1 and the control bits.

The first through seventh demultiplexed signals D1 to D7 are sent in timed relation to the first through seventh clock pulses CLK1 to CLK7 to first through seventh intermediate circuits 141 to 147, respectively. The first through seventh intermediate circuits 141 to 147 are determined for the respective channels ch1 to ch7 and are placed between the demultiplexer 11 and the multiplexer 12, respectively. The first through seventh intermediate circuits 141 to 147 may be collectively called an intermediate section. Since the first through seventh intermediate circuits 141 to 147 are similar in operation and structure to one another except for the bit rates of output signals to the multiplexer 12, description will be therefore mainly made about the first intermediate circuit 141 alone.

Each of the first through seventh intermediate circuits 141 to 147 comprises an elastic memory 15 for memorizing each demultiplexed signal Di in timed relation to the corresponding clock pulses CLKi which will be referred to as first through seventh write-in clock pulses. Inasmuch as each if the first through seventh clock pulses CLKi is inhibited during each stuff pulse, as mentioned before, the stuff pulses are destuffed and are not memorized in the elastic memories 15 of the first through seventh intermediate circuits 141 to 147.

Each sequence of the first through seventh write-in clock pulses CLKi is sent through a first frequency divider 16 as a sequence of first frequency divided clock pulses to a phase comparator 17, as illustrated in the first intermediate circuit 141 of FIG. 1. The phase comparator 17 is coupled through a filter 18 to a voltage-controlled oscillator (VCO) 20 which generates a sequence of readout clock pulses CLK1' to CLK7'. At any rate, the phase comparator 17, the filter 18, and the voltage-controlled oscillator 20 form a phase-locked loop along with the first and the second frequency dividers 16 and 22. A combination of the voltage-controlled oscillator 20 and the filter 18 may be called a phase-locked oscillator.

The readout clock pulse sequence CLKi' is delivered from the voltage controlled oscillator 20 through a second frequency divider 22 as a sequence of second frequency divided clock pulses to the phase comparator 17 on one hand and to the elastic memory 15 and the multiplexer 12 on the other hand. Each of the demultiplexed signals memorized in the elastic memory 15 is read out of the elastic memory 15 in timed relation to each readout clock pulse sequence CLKi' to be sent to the multiplexer 12 as a sequence of intermediate or reproduced demultiplexed signals Ii. The intermediate signals Ii are multiplexed into the output multiplexed signal sequence OUT with stuff pulses added to the output multiplexed signal sequence OUT.

The phase comparator 17 compares the first frequency divided clock pulse sequence with the second frequency divided clock pulse sequence to supply the voltage-controlled oscillator 20 with a phase control signal representative of a result of comparison. Thus, a phase of the readout clock pulse sequence CLKi' is controlled by the voltage-controlled oscillator 20. In this event, the phase of the readout clock pulse sequence CLKi' subtly fluctuates in dependency upon each write-in clock pulse sequence which is subjected to the partial inhibition mentioned above. Therefore, the readout clock pulse sequence has a repetition frequency slowly variable on an average and causes stuff jitters to occur, as mentioned in the preamble of the instant specification.

Moreover, the illustrated repeater arrangement is expensive because the phase-locked loops should be included in the respective intermediate circuits 141 to 147.

Figure 3:
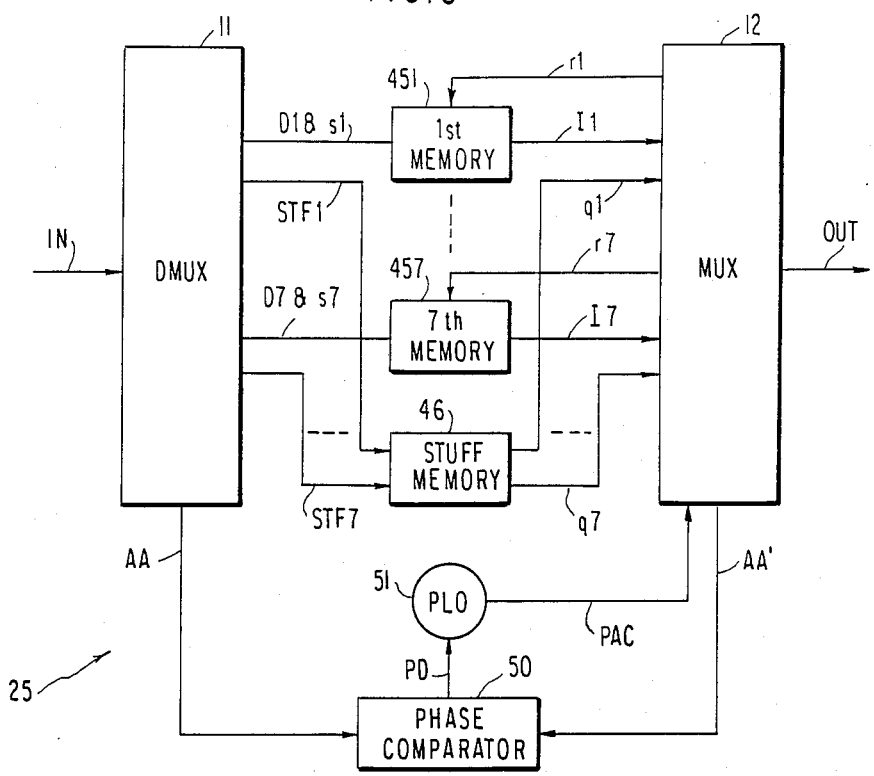
FIG. 3 is a block diagram of a repeater arrangement according to a preferred embodiment of this invention.

Referring to FIG. 3, a repeater arrangement according to a first embodiment of this invention is supplied with a sequence of input multiplexed signals IN to produce a sequence of output multiplexed signals OUT. Each of the input and the output multiplexed signals IN and OUT is similar to that illustrated in FIGS. 2(A), (B) and (C) and will not therefore be described any longer. Like in FIG. 1, the illustrated repeater arrangement comprises a demultiplexer 11, a multiplexer 12, and an intermediate section depicted at 25 in FIG. 3.

Figure 4:
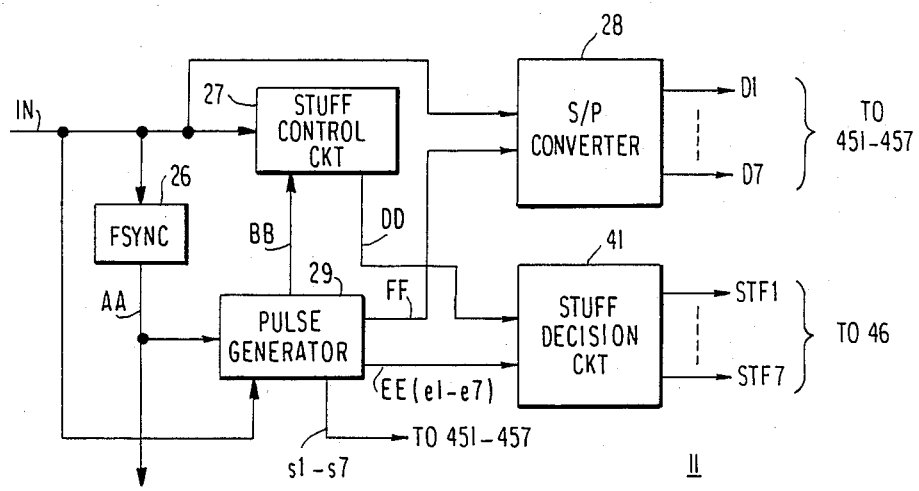
FIG. 4 is a block diagram of a demultiplexer for use in the repeater arrangement illustrated in FIG. 3.
Figure 5:
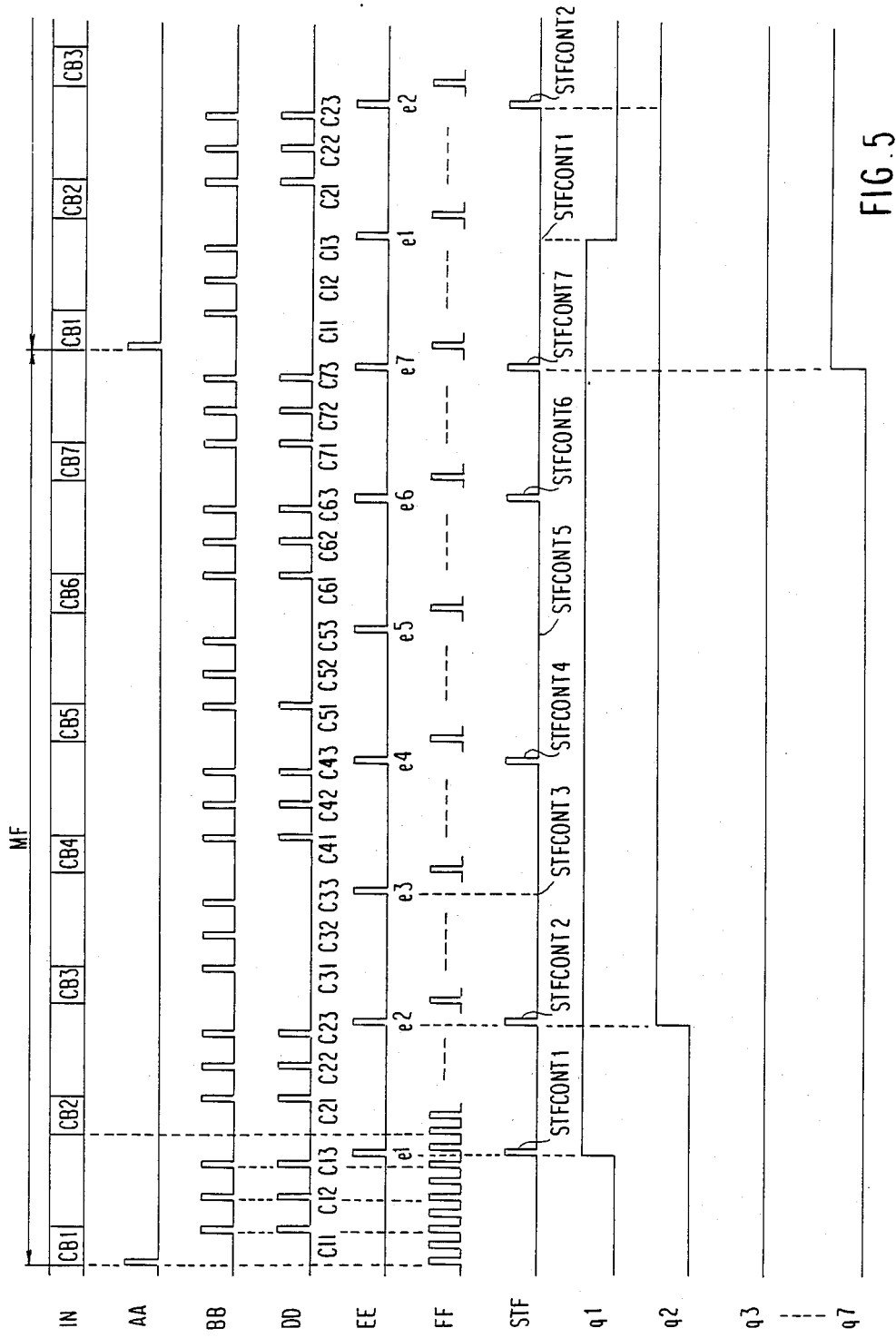
FIG. 5 is a time chart for use in describing operations of the repeater arrangement illustrated in FIG. 3.

Referring to FIGS. 4 and 5 in addition to FIG. 3, the demultiplexer 11 comprises a frame synchronizer (FSYNC) 26, a stuff control circuit (STF CONT) 27, and a serial-to-parallel converter (S/P CONV) 28 all of which are supplied with the input multiplexed signal sequence IN, as shown along a first line of FIG. 5. The frame synchronizer 26 monitors the input multiplexed signal sequence IN to detect the multiframe pulse CB1 (FIG. 2) and to produce a multiframe leading bit signal AA which appears at the leading bit of the multiframe MF, as shown along a second line of FIG. 5. The multiframe pulse CB1 can be detected by monitoring a pattern of the first through seventh multi-subframe pulses CB1 to CB7 in the frame synchronizer 26 in a known manner. The multiframe leading bit signal AA is delivered to a pulse generator 29.

Figure 6:
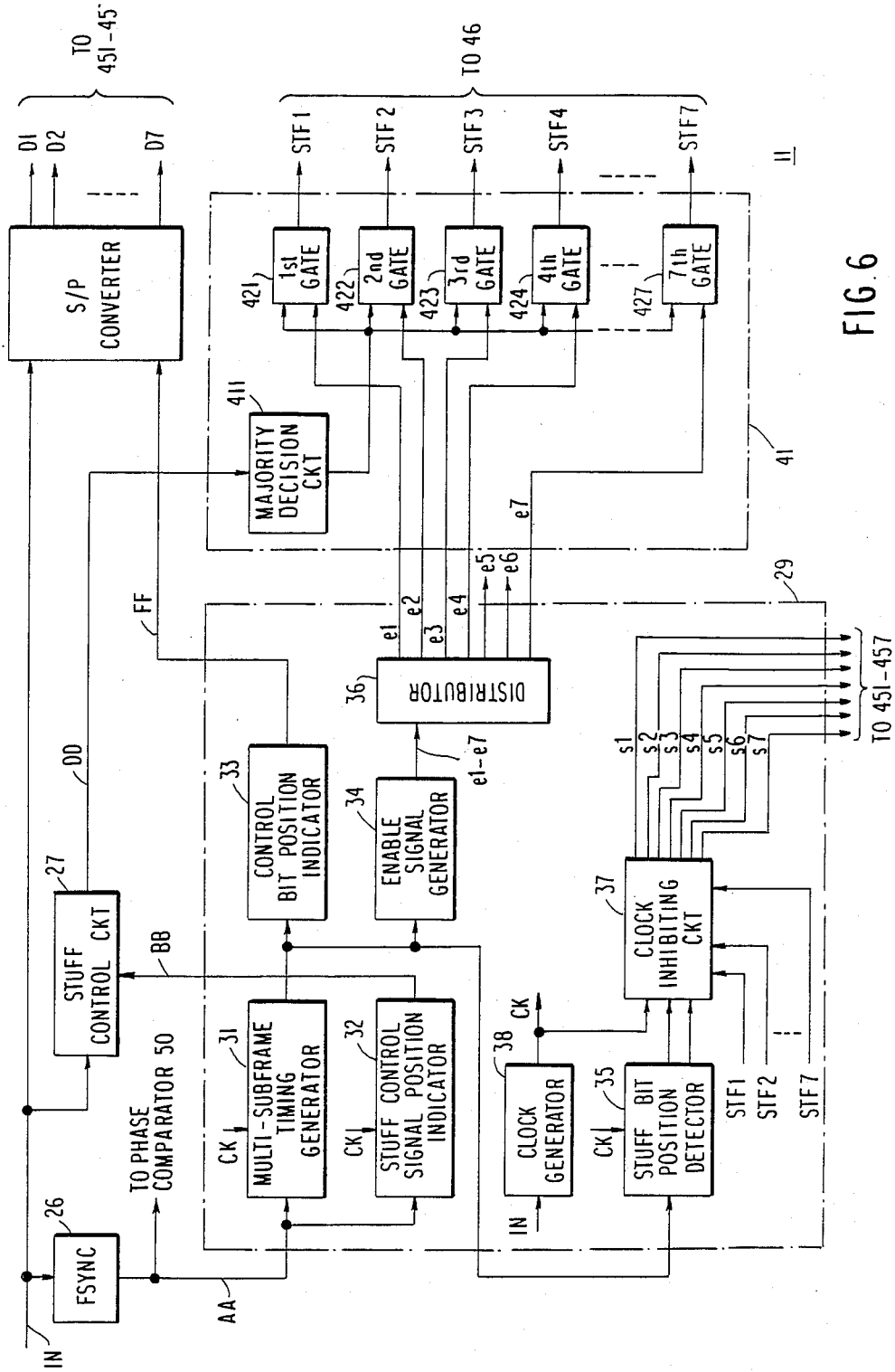
FIG. 6 is a block diagram for use in describing the demultiplexer more in detail.

Referring to FIG. 6 together with FIG. 5, the pulse generator 29 is supplied with the multiframe leading bit signal AA and the input multiplexed signal sequence IN. The pulse generator 29 comprises a clock generator 30 which is operable in response to the input multiplexed signal sequence IN to produce a sequence of internal clock pulses CK appearing at every time slot of the input multiplexed signal sequence IN in synchronism with the input multiplexed signal sequence IN. On the other hand, the multiframe leading bit signal AA is sent to a multi-subframe timing generator 31 and a stuff control signal position indicator 32 both of which are supplied with the internal clock pulse sequence CK. The multi-subframe timing generator 31 produces a sequence of multi-subframe timing pulses synchronized with the first through seventh multi-subframe pulses CB1 to CB7, as shown in FIG. 2(B) while the stuff control signal position indicator 32 produces a sequence of stuff control position signals BB representative of time instants or positions of three of the control bits or signals Ci1 to Ci3 (FIG. 2(B)), as illustrated along a third line of FIG. 5. From this fact, it is readily understood that the stuff control position signals BB are produced in synchronism with three of the control bits of each multi-subframe MSi in a manner shown in FIG. 5. In this connection, the control bits Ci1 to Ci3 may be called stuff control signals.

The stuff control position signals BB are delivered from the stuff control signal position indicator 32 to the stuff control circuit 27 supplied with the input multiplexed signal sequence IN. The stuff control circuit 27 derives the control bite Ci1 to Ci3 from the input mutiplexed signal sequence IN in timed relation to the stuff control position signals BB to produce a sequence or reproduced stuff control signals DD, as shown along a fourth line of FIG. 4.

In the pulse generator 29, the multi-subframe timing pulse sequence is sent from the multi-subframe timing generator 31 to a control bit position indicator 33, an enable signal generator 34, and a stuff bit position detector 35. The enable signal generator 34 supplies a distributor 36 with first through seventh enable pulses e1 to e7 produced after the stuff control bit Ci3, as illustrated along a fifth line EE of FIG. 5. The first through seventh enable pulses e1 to e7 are individually separated by the distributor 36 from one another to be produced as first through seventh individual enable pulses, as shown in FIG. 6.

In addition, the control bit position indicator 33 supplies the serial-to-parallel converter 28 with a sequence of control bit position signals FF indicative of time positions of the control bits appearing at every one of the subframes SF, as shown along a sixth line of FIG. 5.

At any rate, each of the multi-subframe timing generator 31, the stuff control signal position indicator 32, the control bit position indicator 33, and the enable signal generator 34 can be readily implemented by a combination of a timer and a counter and will therefore be described any longer.

As mentioned before, the multi-subframe timing pulse sequence is also delivered from the multi-subframe timing generator 31 to the stuff bit position detector 35. The stuff bit position detector 35 detects the time positions of the stuff pulses or bits in the respective multi-subframes MSi of each multiframe MF to deliver first through seventh stuff timing pulses to a clock inhibiting circuit 37 which is supplied from the clock generator 30 with the internal clock pulse sequence CK. Moreover, the illustrated clock inhibiting circuit 37 is given first through seventh stuff indicating pulses STF1 to STF7 which are produced in a manner to be described later and which are representative of presence or absence of the stuff pulses at the stuff bit positions, as shown along a seventh line STF of FIG. 5. Anyway, the clock inhibiting circuit 37 frequency divides the internal clock pulse sequence CK into seven frequency divided clock pulses and inhibits the stuff pulses located at the stuff time positions by the use of the stuff indicating pulses STFi and the stuff timing pulses. As a result, the clock inhibiting circuit 37 produces first through seventh write-in clock pulses s1 to s7 with clock pulses inhibited at the stuff time positions.

The first through seventh write-in clock pulses s1 to s7 are sent from the pulse generator 29 to the intermediate section 25 (FIG. 3) while the first through seventh individual enable pulses e1 to e7 are sent to a stuff decision circuit 41 together with the reproduced stuff control signals DD.

The stuff decision circuit 41 comprises a majority decision circuit 411 and first through seventh gates 421 to 427 connected to the majority decision circuit 411 and the distributor 36. The majority decision circuit 411 supplies the first through seventh gates 421 to 427 with the logic "1" level or the logic "0" level at every one of the multi-subframes. Specifically, the logic "1" level is supplied from the majority decision circuit 411 to the first through seventh gates 421 to 427 when two or more bits of the reproduced stuff control signals DD are given from the stuff control circuit 27. Otherwise, the logic "0" level is given from the majority decision circuit 411 to each of the first through seventh gates 421 to 427. It is mentioned here that the majority decision circuit 411 is given the reproduced stuff control signals DD prior to the first through seventh individual enable pulses e1 to e7, as shown along the fifth line EE of FIG. 5 and produces the logic "1" or "0" level which lasts until production of the first through seventh individual enable pulses e1 to e7. Under the circumstances, each of the first through seventh gates 421 to 427 is opened to produce the logic "1" level signal as each of the first through seventh reproduced stuff pulses STF1 to STF7 when the logic "1" level is produced by the majority decision circuit 411.

Furthermore, the control bit position signals FF are delivered from the control bit position indicator 33 to the serial-to-parallel converter 28 which is supplied with the input multiplexed signal sequence IN. The serial-to-parallel converter 28 converts the input multiplexed signal sequence IN into first through seventh demultiplexed signals depicted at D1 to D7 with reference to the control bit position signals FF which appear at every one of the subframes SF.

Referring back to FIG. 3, the first through seventh demultiplexed signals D1 to D7 (FIG. 6) are delivered together with the first through seventh write-in clock pulses s1 to s7 from the demultiplexer 11 to first through seventh memories 451 to 457 each of which is operable in a first-in-first-out order. On the other hand, the first through seventh stuff indicating pulses STF1 to STF7 are delivered from the stuff decision circuit 41 to a stuff memory 46.

Figure 7:
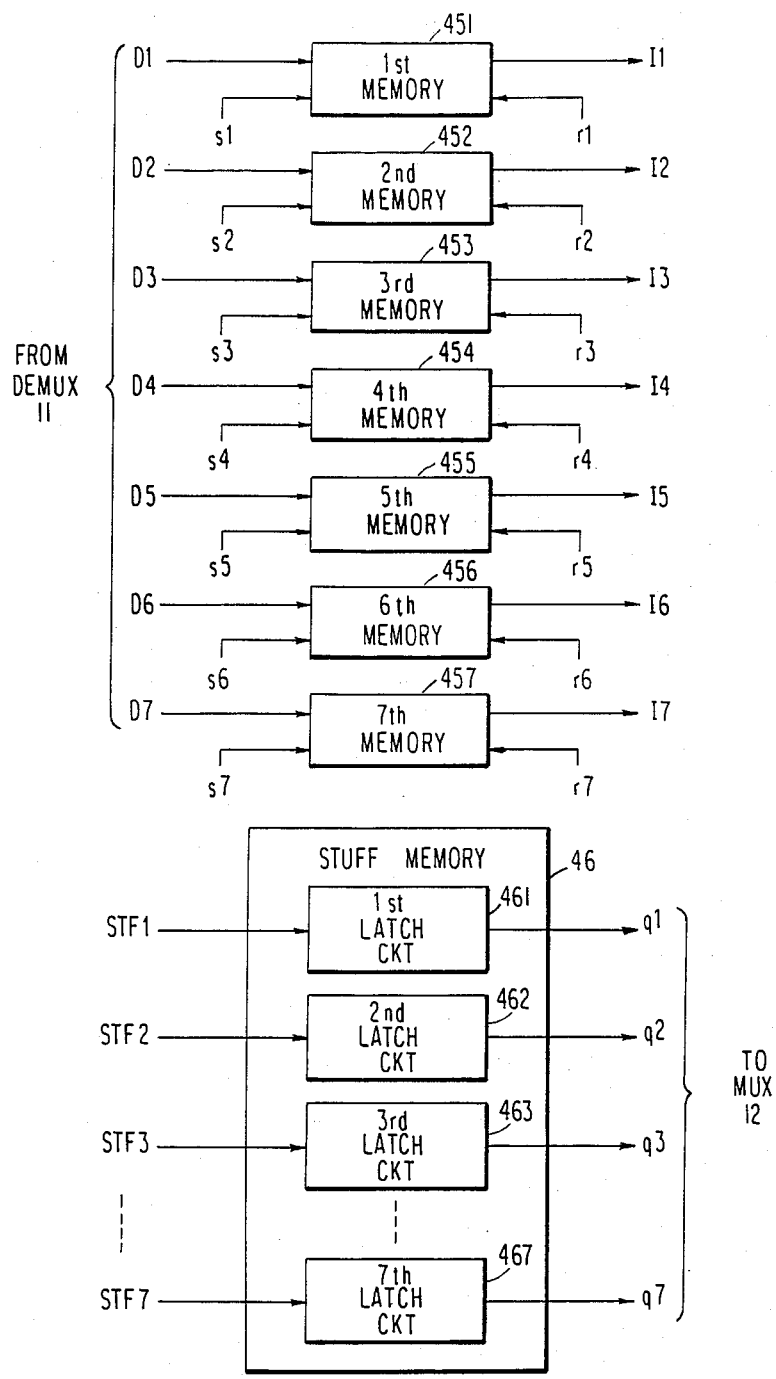
FIG. 7 is a block diagram of an intermediate section used in the repeater arrangement illustrated in FIG. 3.

Temporarily referring to FIG. 7, the first through seventh memories 451 to 457 write the first through seventh demultiplexed signals D1 to D7 in synchronism with the first through seventh write-in clock pulses s1 to s7, respectively. The first through seventh memorized and demultiplexed signals Di are read out of the first through seventh memories 451 to 457 as first through seventh ones of the intermediate signals Ii at the same readout rate of 6.312 Mb/s determined by first through seventh readout clock rates r1 to r7 given from the multiplexer 12 in a manner to be described later. Likewise, the first through seventh stuff indicating pulses STF1 to STF7 are latched into first through seventh latch circuits 461 to 467, respectively. When each of the stuff indicating pulses takes the logic "1" level, a stuff request signal qi of the logic "1" level is produced from each latch circuit and lasts for the multiframe MF, as shown in FIG. 5. In the example illustrated in FIG. 5, the logic "1" level is produced as the stuff request signals q1, q2, and q7 from the first, the second, and the seventh latch circuits 461, 462, and 467.

Figure 8:
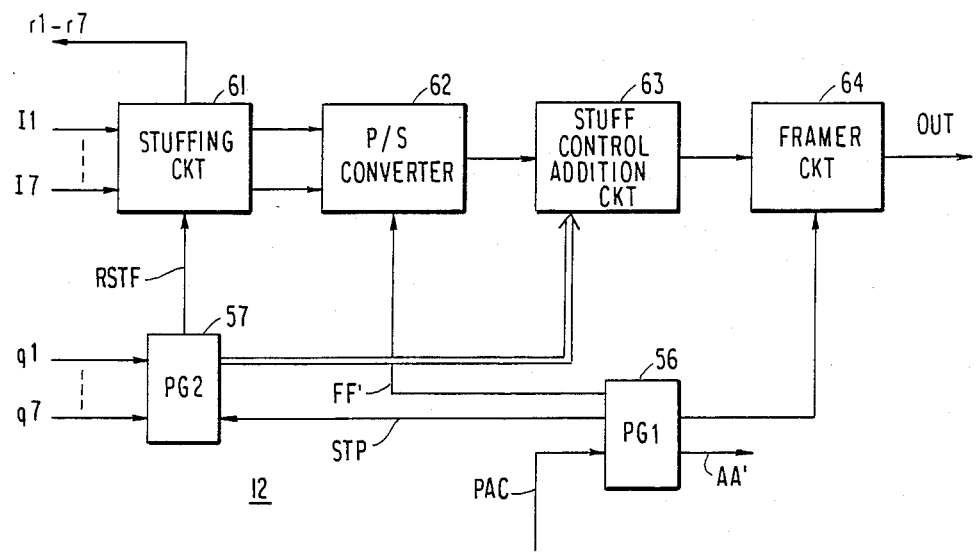
FIG. 8 is a block diagram of a multiplexer illustrated in FIG. 3.

Referring to FIG. 8 afresh and FIG. 3 again, the first through seventh intermediate signals I1 to I7 are sent to the multiplexer 12 together with the stuff request signals q1 to q7, respectively. As shown in FIGS. 3 and 6, the multiframe leading bit signal AA is also sent as a first multiframe pulse signal from the demultiplexer 11 to a phase comparator 50 included in the intermediate section 25. Supplied from the multiplexer 12 with a second multiframe pulse signal AA' produced in a manner to be described later, the phase comparator 50 compares phases of the first and the second multiframe pulse signals AA and AA' with each other to produce a phase difference signal PD representative of a phase difference between the first and the second multiframe pulse signals AA and AA'.

Responsive to the phase difference signal PD, a phase-locked oscillator 51 delivers a phase adjusted timing pulse PAC to the multiplexer 12. The phase-locked oscillator 51 may be a combination of a voltage-controlled oscillator and a filter.

In FIG. 8, the illustrated multiplexer 12 comprises a first multiplexer pulse generator (PG1) 56 which is supplied with the phase adjusted timing pulse PAC and which may be implemented in a manner similar to the pulse generator 29 illustrated in FIG. 6. The first multiplexer pulse generator 56 delivers the second multiframe pulse signal AA' to the phase comparator 50 (FIG. 3). In addition, the first multiplexer pulse generator 56 supplies a second multiplexer pulse generator (PG2) 57 with a sequence of stuff position signals STP representative of time instants of stuff bits to be inserted in the output multiplexed signal sequence OUT.

The second multiplexer pulse generator 57 is supplied from the first through seventh latch circuits 461 to 467 with the first through seventh stuff request signals q1 to q7, as shown in FIG. 5. The first through seventh stuff request signals q1 to q7 are gated by the stuff position signals STP in the second multiplexer pulse generator 57 and produced as reproduced stuff pulses RSTF when each of the stuff request signals q1 to q7 take the logic "1" level.

A stuffing circuit (STF) 61 are given the first through seventh intermediate signals I1 to I7 which are successively read out of the first through seventh memories 451 to 457. Such readout operations of the first through seventh memories 451 to 457 are carried out by delivering the first through seventh readout clock pulses r1 to r7 from the stuffing circuit 61 to the first through seventh memories 451 to 457. Each of the readout clock pulses is suppressed during the presence of the stuff pulse of each channel. As mentioned before, the first through seventh readout clock pulses r1 to r7 have the same bit rate of 6.312 Mb/s. The stuff pulses for the channels are inserted at time positions at which the readout clock pulses are suppressed. In other words, the first through seventh readout clock pulses r1 to r7 are related to stuff information sent from the demultiplexer 11. This means that each of the readout clock pulses r1 to r7 is not varied in phase in dependency upon the write-in clock pulses s1 to s7.

Anyway, the reproduced stuff pulses are located in the stuffing circuit 61 at time positions assigned thereto if the reproduced stuff pulses are present. If no reproduced stuff pulse is present, the readout operations of the memories 451 to 457 are continued without any interruption. Thus, the stuffing circuit 61 produces first through seventh output signals which may be called first through seventh stuffed signals, although they may not always include stuff pulses.

Supplied with the first through seventh stuffed signals in parallel, a parallel-to-serial (P/S) converter 62 converts the first through seventh stuffed signals into a serial signal with reference to a sequence of control bit position signals which is produced in a manner similar to FF (FIG. 5) and which may be depicted at FF'. It is mentioned here that any multi-subframe pulses CB1 to CB7 and the control bits Ci1 to Ci3, F0, F1 are not added to the serial signal.

In order to add the stuff control bit signals Ci1 to Ci3, the serial signal is sent to a stuff control addition circuit 63 which is coupled to the first and the second multiplexer pulse generators 56 and 57. At any rate, the stuff control bits, such as Ci1 to Ci3 (FIG. 5), are added to the serial signal. Such addition of the stuff control bits is readily possible by indicating stuff control bit positions by the first multiplexer pulse generator 56 and by gating each of the first through seventh stuff request signals q1 to q7 at the stuff control bit positions.

After addition of the stuff control bits to the serial signal, a framer circuit (FRM) 64 adds the other control bits, such as F0, F1 and the multi-subframe pulses CBi to produce the output multiplexed signal sequence OUT.

In the example being illustrated, the first through seventh memories 451 to 457 carry out the readout operations by the use of the first through seventh individual readout clock pulses r1 to r7 which have the same rate. The phase comparator 50 compares the first and second multiframe pulses AA and AA' with each other to supply the pulse-adjusted multiframe pulse PAC to the phase-locked oscillator 51. The first through seventh individual readout clock pulses r1 to r7 are based on the phase-adjusted multiframe pulse PAC. In addition, the first through seventh individual readout clock pulses r1 to r7 are produced by the multiplexer 12 which is supplied with the stuff bit positions and the stuff request signals. This shows that the readout clock pulses r1 to r7 are given to the first through seventh memories 451 to 457 in consideration of the stuff pulses included in the input multiplexed signal sequence IN. Therefore, stuff jitters are not accumulated in each channel.

Moreover, the illustrated repeater arrangement comprises a single phase-locked oscillator alone and is very inexpensive and is compact in structure.

What is claimed is:

1. In a repeater arrangement for dealing with a sequence of input multiplexed signals to produce a sequence of output multiplexed signals, each of said input and said output multiplexed signal sequences being a sequence of multiframes each of which is subdivided into a plurality of subframes, each of said input and said output multiplexed signal sequences comprising a sequence of a plurality of data signals assigned to a plurality of channels, respectively, at every subframe and a plurality of stuff pulses arranged in a predetermined one of said subframes, said repeater arrangement comprising a demultiplexer for demultiplexing said input multiplexed signal sequence to produce a plurality of demultiplexed signals assigned to the channels of said multiframes, stuff control signals representative of presence and absence of said stuff bits, and a first multiframe pulse indicative of each multiframe of said input multiplexed signal sequence together with a first set of demultiplexing clock pulses which are synchronized with said demultiplexed signals with said demultiplexing clock pulses suppressed during presence of the stuff pulses, respectively, intermediate means responsive to said demultiplexed signals and said demultiplexing clock pulses for producing a plurality of intermediate demultiplexed signals, and a multiplexer coupled to said intermediate means for multiplexing said intermediate demultiplexed signals into said output multiplexed signal sequence, the improvement wherein said multiplexer comprises:

clock supplying means for supplying said intermediate means with a second set of timing clock pulses at a predetermined clock rate, the timing clock pulses being suppressed during the presence of said stuff pulses; and multiframe producing means responsive to a phase adjusted clock pulse for producing a second multiframe pulse indicative of each multiframe of said output multiplexed signals;

said intermediate means comprising:

first memorizing means operable in a first-in-first-out order and coupled to said demultiplexer and said multiplexer for memorizing said plurality of the demultiplexed signals in response to said first set of the demultiplexing clock pulses with said stuff pulses destuffed, to successively produce, as said intermediate demultiplexed signals, the demultiplexed signals memorized in said memorizing means in timed relation to said second set of the timing clock pulses;

second memorizing means coupled to said demultiplexer and said multiplexer for memorizing said stuff control signals to produce the stuff control signals memorized in said second memorizing means as stuff information signals which are produced at time instants assigned to the demultiplexed signals;

a phase comparator coupled to said demultiplexer and said multiplexer for comparing phases of the first and the second multiframe pulses with each other to produce a phase difference signal representative of a phase difference between said first and said second multiframe pulses;

clock signal generating means responsive to said phase difference signal for producing a sequence of output clock pulses synchronized with said demultiplexing clock pulses; and means for supplying said output clock pulses to said multiplexer as said phase adjusted clock pulse.

2. A repeater arrangement for dealing with a sequence of input multiplexed signals to produce a sequence of output multiplexed signals, each of said input and said output multiplexed signals comprising at least one of stuff pulses within every one of multiframes of said each multiplexed signal and a plurality of data signals distributed to a plurality of channels, said repeater arrangement comprising:

a demultiplexer for demultiplexing said input multiplexed signals into a plurality of demultiplexed signals assigned to the respective channels;

first memory means coupled to said demultiplexer for memorizing said demultiplexed signals with the stuff pulses destuffed to produce reproduced demultiplexed signals in accordance with readout clock pulse sequences;

second memory means coupled to said demultiplexer for memorizing stuff information related to the stuff pulses destuffed;

means coupled to said first and said second memory means for delivering a plurality of clock pulse sequences to said first memory means with reference to said stuff information as said readout clock pulse sequences, each of said clock pulse sequences appearing at time positions assigned to said stuff pulses; and means for multiplexing said reproduced demultiplexed signals into said output multiplexed signal sequence with the stuff pulses added.

* * * * *

UNITED STATES PATENT AND TRADEMARK OFFICE
CERTIFICATE OF CORRECTION

PATENT NO. : 4,884,268

DATED : November 28, 1989

INVENTOR(S) : Kunihiro Goto

It is certified that error appears in the above-identified patent and that said Letters Patent is hereby corrected as shown below:

Column 2, line 26, delete "bite", and insert --bits--.

Signed and Sealed this

Eighth Day of January, 1991

Attest:

HARRY F. MANBECK, JR.

Attesting Officer

Commissioner of Patents and Trademarks